(12) United States Patent
Malti et al.

(10) Patent No.: US 10,366,510 B1
(45) Date of Patent: Jul. 30, 2019

(54) SYSTEMS AND METHODS FOR DETERMINING LOCATION AND ORIENTATION OF A BODY

(71) Applicant: Octi, Los Angeles, CA (US)

(72) Inventors: Abed Malti, Los Angeles, CA (US); Justin Fuisz, Los Angeles, CA (US)

(73) Assignee: Octi, Los Angeles, CA (US)

( * ) Notice: Subject to any disclaimer, the term of this patent is extended or adjusted under 35 U.S.C. 154(b) by 0 days.

(21) Appl. No.: 16/151,634

(22) Filed: Oct. 4, 2018

Related U.S. Application Data

(60) Provisional application No. 62/568,018, filed on Oct. 4, 2017.

(51) Int. Cl.
*G06K 9/00* (2006.01)
*G06T 7/73* (2017.01)
(Continued)

(52) U.S. Cl.
CPC ............ *G06T 7/75* (2017.01); *G06K 9/00369* (2013.01); *G06T 7/50* (2017.01); *G06T 19/006* (2013.01);
(Continued)

(58) Field of Classification Search
CPC .. G06T 7/75; G06T 7/50; G06T 7/521; G06T 7/55; G06T 7/12; G06T 7/13; G06T 7/149; G06T 7/181; G06T 7/60; G06T 7/251; G06T 13/40; G06T 15/10; G06T 15/205; G06T 17/00; G06T 17/10; G06T 19/006; G06T 19/00; G06T 19/20; G06T 2200/08; G06T 2200/04; G06T 2207/10012; G06T 2207/10028; G06T 2207/30196; G06T 2210/41; G06K 9/00369; G06K 9/2036; G06K 9/209; G06K 9/6203; G06K 9/4604; G06K 9/4671; G06K 9/00201; G06K 9/00268; G06K 9/6215; G06K 9/00208; G06K 9/00335; G06K 9/00342;
(Continued)

(56) References Cited

U.S. PATENT DOCUMENTS 8,565,485 B2 * 10/2013 Craig ................. G06K 9/00369
  375/240.1
8,682,028 B2 * 3/2014 Geiss ...................... G06T 7/251
  382/103
(Continued)

*Primary Examiner* — Jose L Couso
(74) *Attorney, Agent, or Firm* — Goodwin Procter LLP

(57) ABSTRACT

The invention provides the techniques and systems that allow for an accurate positioning of a human in a virtual or augmented reality scene based on monocular video of an object without the need for multiple cameras, specialized equipment or robotic models of the human anatomy. The object is modeled by assigning reference points to elements of the object and identifying anchor points and initial reference points. Based on two dimensional coordinates of the anchor points, two dimensional coordinates of the anchor points not contained in the subset of initial reference points are calculated, and based on the anchor points, a depth value is calculated for each anchor point, and three dimensional position values are assigned to each of the anchor points. Based on the three dimensional position value of an adjacent reference point, a three dimensional position value is iteratively assigned to each of the remaining reference points.

20 Claims, 2 Drawing Sheets

(51) Int. Cl.
*G06T 7/50* (2017.01)
*G06T 19/00* (2011.01)

(52) U.S. Cl.
CPC .................. *G06T 2207/30196* (2013.01);
*G06T 2210/56* (2013.01)

(58) Field of Classification Search
CPC .... G06K 9/00355; G01B 11/14; G01B 11/24;
G01B 11/2513; G01B 11/026; G01B
2210/52; H04N 13/204; G06F 3/04842;
G06F 3/04815; G06F 3/011; G06F 3/033;
G06F 17/30256; A63F 13/428; A63F
2300/6607; A63F 2300/1012
See application file for complete search history.

(56) References Cited

U.S. PATENT DOCUMENTS

| | | | |
|---|---|---|---|
| 2010/0195869 A1* | 8/2010 | Geiss | G06K 9/00369 382/103 |
| 2010/0197392 A1* | 8/2010 | Geiss | G06T 7/251 463/30 |
| 2010/0197395 A1* | 8/2010 | Geiss | G06T 7/251 463/31 |
| 2010/0197400 A1* | 8/2010 | Geiss | G06K 9/00201 463/32 |
| 2016/0086350 A1* | 3/2016 | Michel | G06K 9/00362 382/103 |
| 2018/0047175 A1* | 2/2018 | Wang | G06T 7/194 |
| 2018/0053308 A1* | 2/2018 | Maani | G06T 7/251 |

\* cited by examiner

SYSTEMS AND METHODS FOR DETERMINING LOCATION AND ORIENTATION OF A BODY

CROSS-REFERENCE TO RELATED APPLICATIONS

This application claims priority to and the benefit of U.S. Provisional Patent Application Ser. No. 62/568,018, filed on Oct. 4, 2017, the entire disclosure of which is incorporated herein by reference.

FIELD OF THE INVENTION

The subject matter of this application relates generally to techniques for determining three dimensional locations of objects in a two dimensional image, and, more specifically, to computing the three dimensional orientation of a human within an image.

BACKGROUND

Cameras, including video cameras, have become ubiquitous in today's society. With the introduction of cameras into mobile phones, and the explosion of social media applications with which one can share content, consumers have effectively become real-time producers of content for the world to see. Applications such as Snapchat, Instagram, and others use user-generated content such as pictures and video as a basis for messages "stories" that are shared among the application community.

To attract and retain users, these applications must continually add new features and effects. Certain effects, such as combining and manipulating video content, recognizing humans, and manipulating the images, however can introduce computationally intensive processing requirements, and, in many cases, result in poor quality. Moreover, these features face a steep adoption curve if they are not simple to use and work quickly (and with minimal power drain) within the constraints of mobile device computing resources.

SUMMARY OF THE INVENTION

The invention provides the techniques and systems that allow for an accurate positioning of an object in a virtual or augmented reality scene based on monocular video of object without the need for multiple cameras, specialized equipment or robotic models of the object or of human anatomy. As one of the multiple usages, image sequences can be created that contain various effects, graphical assets, animations, and other assets from an initial two-dimensional image while maintaining the spatial integrity and relationships among objects in the image sequence. By providing an accurate position of the skeleton within a scene, accurate augmented and mixed reality image sequences can be created that incorporate human interaction.

In one aspect, the invention provides a method to calculate a three-dimensional orientation of an object within an image that includes receiving a video stream from an image capture device (e.g., a two-dimensional digital camera, mobile phone camera, or the like), and selecting a single frame from the video stream, wherein the single frame comprises an image of at least one object. The object is modeled by assigning each of a set of object elements as reference points and identifying a subset of the reference points as anchor points, and further selecting a subset of the anchor points as initial reference points. Based on two dimensional coordinates of the anchor points, two dimensional coordinates of the anchor points not contained in the subset of initial reference points are calculated, and based on the anchor points, a depth value is calculated for each anchor point, and three dimensional position values are assigned to each of the anchor points. Based on the three dimensional position value of an adjacent reference point, a three dimensional position value is iteratively assigned to each of the remaining reference points.

In some embodiments, the object comprises a human body and the set of object elements is a set of identified anatomical joints. In such cases, the anchor points may be two pairs of reference points, each pair comprising adjacent body parts. In some embodiments, the calculation of the depth value for the anchor points is based in part on the two dimensional coordinates of the anchor points and a set of estimated object element lengths. In some cases, the three dimensional position values are assigned to each of the anchor points based at least in part on based on the two dimensional coordinates, the calculated depth values, and a first scale factor, which may represent a ratio associated with the object. In instances in which the object is a human body, the scale factor may comprise a ratio of a distance between a first pair of anatomical joints as compared to a distance between a second pair of anatomical joints, such as a right shoulder joint and a left shoulder joint, and a right hip joint and a left hip joint.

In another aspect, the invention provides a computerized system for calculating a three-dimensional orientation of a camera based on images of objects within the cameras field of view. The system includes at least one memory storing computer-executable instructions and at least one processing unit for executing the instructions stored in the memory, wherein execution of the instructions results in one or more application modules for providing an application for execution on a mobile device. The application, receives a video stream from an image capture device (e.g., a two-dimensional digital camera, mobile phone camera, or the like), and selects a single frame from the video stream, wherein the single frame comprises an image of at least one object. The object is modeled by assigning each of a set of object elements as reference points and identifying a subset of the reference points as anchor points, and further selecting a subset of the anchor points as initial reference points. Based on two dimensional coordinates of the anchor points, two dimensional coordinates of the anchor points not contained in the subset of initial reference points are calculated, and based on the anchor points, a depth value is calculated for each anchor point, and three dimensional position values are assigned to each of the anchor points. Based on the three dimensional position value of an adjacent reference point, a three dimensional position value is iteratively assigned to each of the remaining reference points.

In some embodiments, the object comprises a human body and the set of object elements is a set of identified anatomical joints. In such cases, the anchor points may be two pairs of reference points, each pair comprising adjacent body parts. In some embodiments, the calculation of the depth value for the anchor points is based in part on the two dimensional coordinates of the anchor points and a set of estimated object element lengths. In some cases, the three dimensional position values are assigned to each of the anchor points based at least in part on based on the two dimensional coordinates, the calculated depth values, and a first scale factor, which may represent a ratio associated with the object. In instances in which the object is a human body, the scale factor may comprise a ratio of a distance between a first pair of anatomical joints as compared to a distance between a second pair of anatomical joints, such as a right shoulder joint and a left shoulder joint, and a right hip joint and a left hip joint.

BRIEF DESCRIPTION OF THE DRAWINGS

Advantages of the some embodiments may be understood by referring to the following description taken in conjunction with the accompanying drawings. In the drawings, like reference characters generally refer to the same parts throughout the different views. Also, the drawings are not necessarily to scale, emphasis instead generally being placed upon illustrating principles of some embodiments of the invention.

DETAILED DESCRIPTION

In one aspect of the invention, a monocular video sequence is created using a camera. The techniques described herein estimate a three-dimensional position of an object (e.g., a human body) from a single image frame independently from the other images of the video and without the need for specialized lenses or additional imaging devices. This results in a three-dimensional understanding for each image frame of the video of where the human shape is positioned within the scene and relative to the camera position.

Unlike conventional methods where occlusion of the anchor/reference points or leaving the scene prohibits the continued tracking of the environment, the technique and supporting systems described herein, three-dimensional effects can continued to be rendered accurately as long as the object is in the frame. Moreover, the calculations are analytic and only require relative and/or estimated distances between reference points (e.g., for a human, estimated limb lengths) and two-dimensional pixel locations, thus significantly reducing the computational complexity and increasing the speed at which the estimates can be made.

Moreover, embodiments of the invention can be implemented using a single-lens, two-dimensional camera without significant computing resources thus eliminating the need to provide specialized recording devices, commercial cameras, or specialized software. As a result, the effects and imagery can be implemented using phone-based cameras and processing hardware in real time.

As a result, users can, for example:
render three-dimensional objects and effects within the scene and freely "move" around them in the video sequences;
create fully immersive augmented reality scenes;
interact within a scene with various objects and other people within a given scene;
create "games" in which the spatial relationships among people, real objects, and rendered objects are used within a given image sequence; and
create a new form of communication within video sequences using three-dimensionally rendered objects.

These applications can then be applied to applications in the field of medicine, sports, video surveillance and others.

As a basis to compute the position of a an object relative to a camera position a monocular video sequence is taken of the object in motion. The video can be taken using a camera embedded on a mobile phone, or any other camera. The video can be processed on the camera using, for example, an application that takes advantage of the phone's storage and processing features, or, sent to a separate device for processing.

Figure 1:
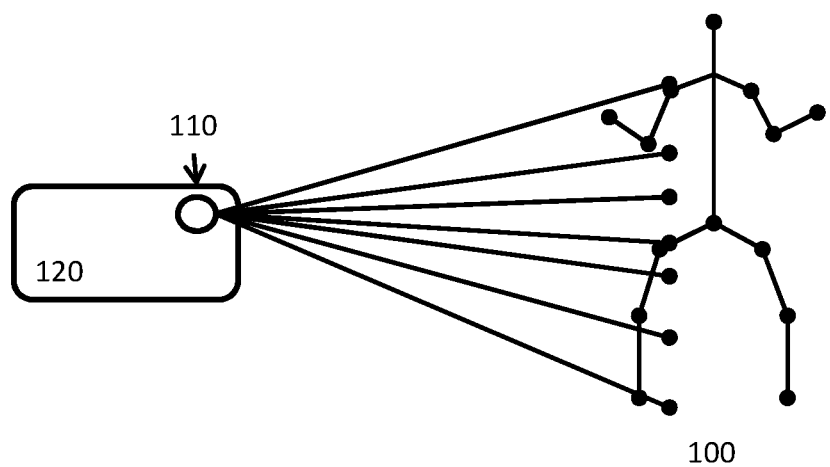
FIG. 1 is an illustrative environment in which various embodiments of the invention may be implemented.
Figure 2:
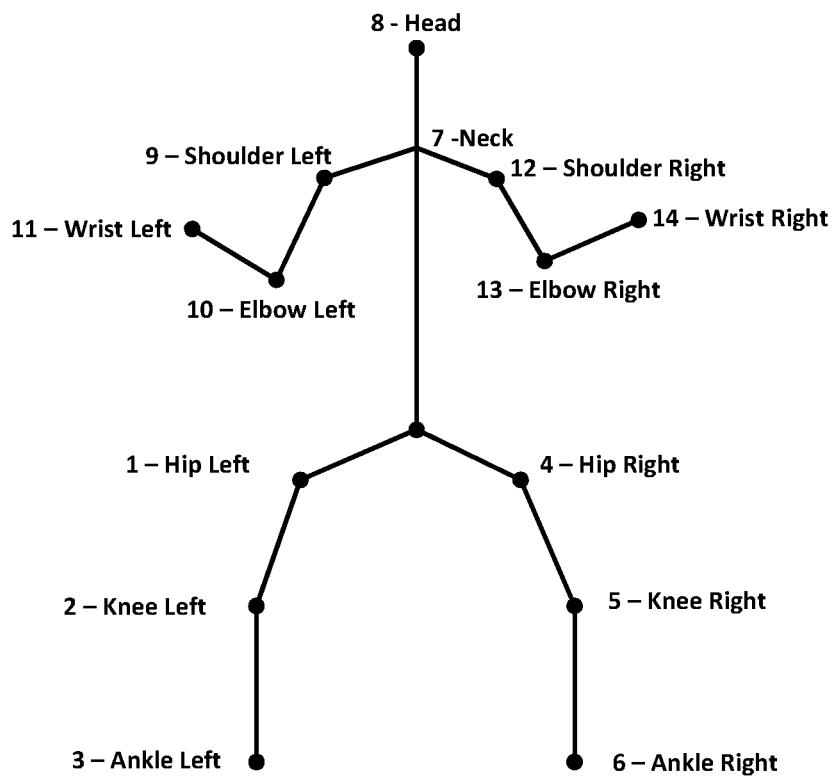
FIG. 2 illustrates a human form with body elements annotated to capture and calculate positional data in accordance with various embodiments of the invention.

FIG. 1 illustrates an example using a human body as the object with various body elements ("joints") as points of potential movement identified. Each point is initially identified using the two-dimensional coordinates (u, v).

Known parameters include an intrinsic matrix representing the camera's frame of reference K:

$$K = \begin{bmatrix} f_x & 0 & c_x \\ 0 & d_y & c_y \\ 0 & 0 & 1 \end{bmatrix}$$

the distances (either exactly or an estimate) between adjacent joints i and k, noted as $l_{i,k}$ (e.g., limb lengths such as the length from a knee to an ankle), and the two-dimensional position with respect to the camera's frame of reference. The techniques described herein use the known two-dimensional limb location values to calculate the three-dimensional position $P_i$ for each limb i=1, . . . 14, denoted as:

$$\begin{pmatrix} u_i \\ v_i \end{pmatrix}$$

Initially, a matrix T is constructed using only two-dimensional points to describe the relationship between any three of the following four points {1, 4, 9 and 12} (referred to herein as "anchor points"), based on the assumption that shoulder-to-shoulder and hip-to-hip vectors are going to be substantially parallel to each other and therefore have a similar depth value (e.g., it is unlikely that someone's right hip will be significantly further forward or backwards with respect to their left hip, etc.). For other objects (e.g., animals, cars, buildings, etc.) an object-specific set of reference points and anchor points may be selected based on the geometry of the object. For example, if an automobile is being modeled, the wheels may be selected as anchor points, knowing the general dimensions of the car and assuming the wheels remain generally stable with respect to each other.

In the human body example detailed below, the left hip (point 1), right hip (point 4) and left shoulder (point 9) are used as the known joints—or subset of points selected from the set of anchor points, and the inverse of T is multiplied by a vector of coordinates of the fourth point (the remaining anchor point—in this case the right shoulder (point 12):

$$T = \begin{pmatrix} u_9 & u_1 & u_4 \\ v_9 & v_1 & v_4 \\ 1 & 1 & 1 \end{pmatrix}^{-1} \begin{pmatrix} u_{12} \\ v_{12} \\ 1 \end{pmatrix} = \begin{pmatrix} T_1 \\ T_2 \\ T_3 \end{pmatrix}$$

Assuming a known (or accurately estimated) distance from shoulder to shoulder as $dist1 = l_{9,12}$ and hip to hip as $dist2 = l_{1,4}$, the depth of the first of the four anchor points (denoted as $\lambda_0$, $\lambda_1$, $\lambda_2$, and $\lambda_3$) can then be computed as:

$$\lambda_1 = \frac{dist1}{\left\| T_3 K^{-1} \begin{pmatrix} u_4 \\ v_4 \\ 1 \end{pmatrix} - T_2 K^{-1} \begin{pmatrix} u_1 \\ v_1 \\ 1 \end{pmatrix} \right\|}$$

Once the first depth value is calculated, the depth values can be calculated for the three remaining anchor points as:

$$\lambda_0 = T_1 \lambda_1;$$

$$\lambda_2 = |T_1| \frac{\lambda_1}{dist_1}; \text{ and}$$

$$\lambda_3 = T_3 \frac{\lambda_1 dist_2}{dist_1}$$

based on the relationships among the four reference points, and the distances between two shoulders and two hip points.

Using the calculated depth values, overall estimated position values P' for each of the initial four anchor points can be calculated as follows:

$$P'_1 = \lambda_2 K^{-1} \begin{pmatrix} u_1 \\ v_1 \\ 1 \end{pmatrix};$$

$$P'_4 = \lambda_3 K^{-1} \begin{pmatrix} u_4 \\ v_4 \\ 1 \end{pmatrix};$$

$$P'_9 = \lambda_0 K^{-1} \begin{pmatrix} u_9 \\ v_9 \\ 1 \end{pmatrix}; \text{ and}$$

$$P'_{12} = \lambda_1 K^{-1} \begin{pmatrix} u_{12} \\ v_{12} \\ 1 \end{pmatrix}.$$

Basing an estimated scale factor that respects a common ratio of shoulder width to hip width of:

$$E = \frac{dist_1}{\|P'_9 - P'_{12}\|}$$

the actual positions of each of the four initial joints can be calculated as:

$$P_1 = EP'_1;$$

$$P_4 = EP'_4;$$

$$P_9 = EP'_9; \text{ and}$$

$$P_{12} = EP'_{12}.$$

Basing an estimated scale factor that respects a common ratio of shoulder width to hip width, the position of the neck joint can be calculated as:

$$P_7 = \frac{1}{2}(P_9 + P_{12}).$$

For the remaining joints, an iterative process is used to calculate the position of joint k based on knowing joint i and is described below:

Given $P_i$, to calculate $P_k$

Define $$w = K^{-1} \begin{pmatrix} u_k \\ v_k \\ 1 \end{pmatrix}$$

and $l_{i,k}$ as the limb length between joints j and k.

Calculate A as $A = <w, P_i>^2 - (<P_i, P_i> - l_{i,k}^2)<w,w>$ (where $<w, w>$ is the dot product).

If A<0, then $$z = \frac{\langle w, P_i \rangle}{\langle w, w \rangle},$$

else if A>0 then $$z = \min\left( \frac{\langle w_i, P_i \rangle - \sqrt{A}}{\langle w, w \rangle}, \frac{\langle w_i, P_i \rangle + \sqrt{A}}{\langle w, w \rangle} \right),$$

and $P_k = z \times w$.

The same process is then repeated for each remaining point using one of the adjacent points as input to find the unknown P, given that $P_1, P_4, P_9, P_{12}$, and $P_7$ are now known.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. One or more memories can store media assets (e.g., audio, video, graphics, interface elements, and/or other media files), configuration files, and/or instructions that, when executed by a processor, form the modules, engines, and other components described herein and perform the functionality associated with the components. The processor and the memory can be supplemented by, or incorporated in special purpose logic circuitry.

It should also be noted that the present implementations can be provided as one or more computer-readable programs embodied on or in one or more articles of manufacture. The article of manufacture can be any suitable hardware apparatus, such as, for example, a floppy disk, a hard disk, a CD-ROM, a CD-RW, a CD-R, a DVD-ROM, a DVD-RW, a DVD-R, a flash memory card, a PROM, a RAM, a ROM, or a magnetic tape. In general, the computer-readable programs can be implemented in any programming language. The software programs can be further translated into machine language or virtual machine instructions and stored in a program file in that form. The program file can then be stored on or in one or more of the articles of manufacture.

What is claimed is:

1. A method to calculate a three-dimensional orientation of an object within an image, the method comprising:
   receiving a video stream from a two-dimensional image capture device;
   selecting a single frame from the video stream, wherein the single frame comprises an image of at least one object;
   modeling the object by assigning each of a set of object elements as reference points and identifying a subset of the reference points as anchor points;
   selecting a subset of the anchor points as initial reference points;
   based on two dimensional coordinates of the anchor points, calculating two dimensional coordinates of the anchor points not contained in the subset of initial reference points;
   calculating a depth value for the anchor points;
   assigning three dimensional position values to each of the anchor points; and
   iteratively determining a three dimensional position value to each remaining reference points based on the three dimensional position value of an adjacent reference point.

2. The method of claim 1 wherein the image capture device comprises a camera embedded within a mobile phone.

3. The method of claim 1 wherein the object comprises a human body.

4. The method of claim 3 wherein the set of object elements comprises a plurality of anatomical joints.

5. The method of claim 4 wherein the anchor points comprise two pairs of reference points, each pair comprising adjacent body parts.

6. The method of claim 1 wherein the calculation of the depth value for the anchor points is based in part on the two dimensional coordinates of the anchor points and a set of estimated object element lengths.

7. The method of claim 1 wherein the three dimensional position values are assigned to each of the anchor points based at least in part on based on the two dimensional coordinates, the calculated depth values, and a first scale factor.

8. The method of claim 7 wherein the first scale factor represents a ratio associated with the object.

9. The method of claim 8 wherein the object comprises a human body and the scale factor comprises a ratio of a distance between a first pair of anatomical joints as compared to a distance between a second pair of anatomical joints.

10. The method of claim 9 wherein the first pair of anatomical joints comprises a right shoulder joint and a left shoulder joint, and the second pair of anatomical joints comprises a right hip joint and a left hip joint.

11. A computerized system for calculating a three-dimensional orientation of an object within an image, the system comprising:
   at least one memory storing computer-executable instructions; and
   at least one processing unit for executing the instructions stored in the memory, wherein execution of the instructions results in one or more application modules for
   providing an application for execution on a mobile device, wherein the application performs the following functions:
      receiving a video stream from a two-dimensional image capture device;
      selecting a single frame from the video stream, wherein the single frame comprises an image of at least one object;
      modeling the object by assigning each of a set of object elements as reference points and identifying a subset of the reference points as anchor points;
      selecting a subset of the anchor points as initial reference points;
      based on two dimensional coordinates of the anchor points, calculating two dimensional coordinates of the anchor points not contained in the subset of initial reference points;
      calculating a depth value for the anchor points;
      assigning three dimensional position values to each of the anchor points; and
      iteratively determining a three dimensional position value to each remaining reference points based on the three dimensional position value of an adjacent reference point.

12. The system of claim 11 wherein the image capture device comprises a camera embedded within the mobile device.

13. The system of claim 11 wherein the object comprises a human body.

14. The system of claim 13 wherein the set of object elements comprises a plurality of anatomical joints.

15. The system of claim 14 wherein the anchor points comprise two pairs of reference points, each pair comprising adjacent body parts.

16. The system of claim 11 wherein the calculation of the depth value for the anchor points is based in part on the two dimensional coordinates of the anchor points and a set of estimated object element lengths.

17. The system of claim 11 wherein the three dimensional position values are assigned to each of the anchor points based at least in part on based on the two dimensional coordinates, the calculated depth values, and a first scale factor.

18. The system of claim 17 wherein the first scale factor represents a ratio associated with the object.

19. The system of claim 18 wherein the object comprises a human body and the scale factor comprises a ratio of a distance between a first pair of anatomical joints as compared to a distance between a second pair of anatomical joints.

20. The system of claim 19 wherein the first pair of anatomical joints comprises a right shoulder joint and a left shoulder joint, and the second pair of anatomical joints comprises a right hip joint and a left hip joint.

* * * * *